(12) United States Patent
Peng (10) Patent No.: US 12,521,941 B2
(45) Date of Patent: Jan. 13, 2026

(54) 3D PRINTING DEVICE AND METHOD USING RELEASE FILM TO PUSH LIQUID HORIZONTALLY TO REALIZE COATING

(71) Applicant: BMF NANO MATERIAL TECHNOLOGY CO., LTD, Shenzhen (CN)

(72) Inventor: Chong Peng, Shenzhen (CN)

(73) Assignee: BMF NANO MATERIAL TECHNOLOGY CO., LTD, Shenzhen (CN)

( * ) Notice: Subject to any disclaimer, the term of this patent is extended or adjusted under 35 U.S.C. 154(b) by 272 days.

(21) Appl. No.: 18/498,068

(22) Filed: Oct. 31, 2023

(65) Prior Publication Data

US 2024/0075685 A1  Mar. 7, 2024

Related U.S. Application Data

(63) Continuation of application No. PCT/CN2022/103856, filed on Jul. 5, 2022.

(30) Foreign Application Priority Data

Jun. 20, 2022  (CN) .......................... 202210698273.2

(51) Int. Cl.
    *B29C 64/245*    (2017.01)
    *B29C 64/124*    (2017.01)
    (Continued)

(52) U.S. Cl.
    CPC .......... *B29C 64/245* (2017.08); *B29C 64/124* (2017.08); *B29C 64/393* (2017.08);
    (Continued)

(58) Field of Classification Search
CPC ... B29C 64/124; B29C 64/129; B29C 64/135; B33Y 10/00; B33Y 30/00; B33Y 50/02
See application file for complete search history.

(56) References Cited

U.S. PATENT DOCUMENTS 5,447,822 A    9/1995  Hull

FOREIGN PATENT DOCUMENTS

| CN | 205651669 U | 10/2016 |
|---|---|---|
| CN | 107214960 A | 9/2017 |

(Continued)

OTHER PUBLICATIONS

International Search Report of PCT Patent Application No. PCT/CN2022/103856 issued on Dec. 19, 2022.

(Continued)

*Primary Examiner* — JaMel M Nelson
(74) *Attorney, Agent, or Firm* — Andrew C. Cheng (57) ABSTRACT

A 3D printing device includes a liquid bath configured to contain liquid resin and having a main area and an extending area; a printing platform configured to carry a printed sample and inserted into the main area; and a release film assembly including a release film and a release film driving unit for driving the release film to move horizontally between the main area and the extending area. The invention has the following beneficial effects: 1, various errors caused by use of a quick levelling component such as a hub are eliminated, thus improving the printing quality; 2, an accurate printing thickness can be obtained by horizontally pushing printing liquid once by the release film, thus improving the printing efficiency; and 3, when the printing platform is assembled or disassembled, the release film can move to the extending area and does not need to be disassembled, so operation is simplified.

8 Claims, 9 Drawing Sheets

(51) Int. Cl.
  *B29C 64/393* (2017.01)
  *B33Y 10/00* (2015.01)
  *B33Y 30/00* (2015.01)
  *B33Y 50/02* (2015.01)

(52) U.S. Cl.
  CPC .............. *B33Y 10/00* (2014.12); *B33Y 30/00* (2014.12); *B33Y 50/02* (2014.12)

(56) References Cited

FOREIGN PATENT DOCUMENTS

| | | | | |
|---|---|---|---|---|
| CN | 111168995 A | | 5/2020 | |
| CN | 112265263 A | * | 1/2021 | ............. B29C 64/30 |
| CN | 112621979 A | | 4/2021 | |
| CN | 213704549 U | | 7/2021 | |
| CN | 113199747 A | | 8/2021 | |
| CN | 113942224 A | | 1/2022 | |
| CN | 114619667 A | | 6/2022 | |
| CN | 114986881 A | | 9/2022 | |
| EP | 0484086 A1 | | 5/1992 | |
| JP | H07329189 A | | 12/1995 | |
| WO | 2022100461 A1 | | 5/2022 | |

OTHER PUBLICATIONS

Search report of CN application No. 202210698273.2 issued on Dec. 26, 2022.

* cited by examiner

3D PRINTING DEVICE AND METHOD USING RELEASE FILM TO PUSH LIQUID HORIZONTALLY TO REALIZE COATING

FIELD

The application belongs to the technical field of 3D printing, and particularly relates to a 3D printing device and method using a release film to push liquid horizontally to realize coating.

BACKGROUND

Figure 1:
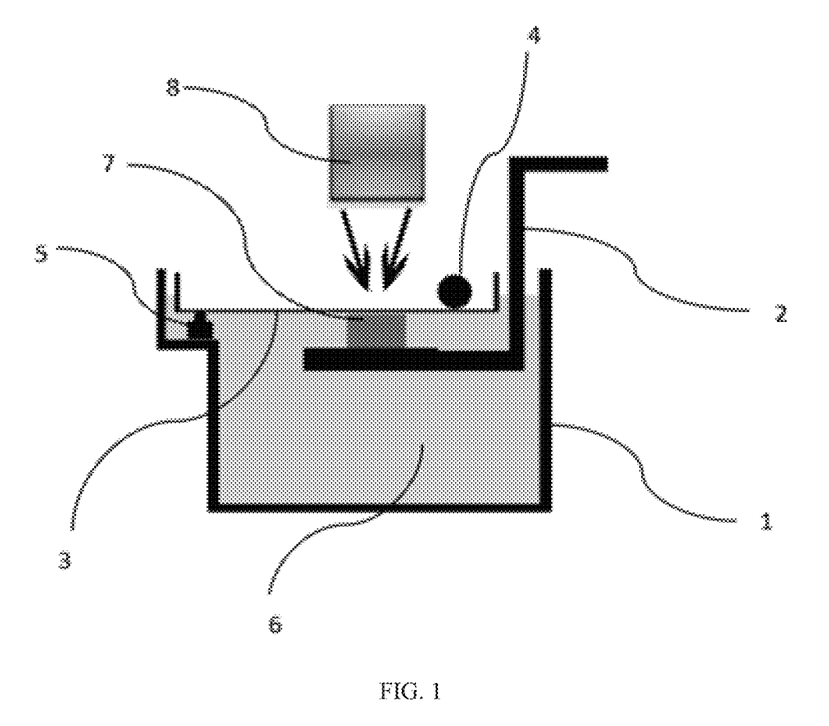
FIG. 1 is a schematic diagram of a traditional 3D printing structure using a hob for levelling.

At present, during high-accuracy photocuring 3D printing, an optical machine is usually disposed above a liquid bath, such that a thinner release film can be used, or even self-levelling can be used to allow a pattern to be projected onto photosensitive resin accurately, to obtain higher accuracy. However, with the increase of the requirements for the printing breadth and the viscosity of suitable liquid resin, there is still a long levelling wait time before a desired printing thickness is obtained in the actual printing process even if a release film is used. So, a new quick levelling method based on a hob is developed by BMF to solve the problem of low efficiency caused by a long levelling time during printing. As shown in FIG. 1 which is a schematic diagram of an existing 3D printing structure, a light path is located above a liquid bath 1, and a release film assembly 3 is fixed in the liquid bath 1; when a printing platform 2 ascends, liquid resin 6 will be carried, the release film assembly 3 will bulge upwards, and at this moment, a levelling hub 4 disposed on an upper surface of the release film assembly 3 will roll leftwards and rightwards to level the release film assembly 3, such that the levelling wait time during printing can be greatly shortened. This printing structure also adopts a bubble scraper 5, which can slide leftwards and rightwards along a lower surface of the release film assembly 3 to eliminate bubbles on the lower surface of the release film assembly 3, such that the printing quality will not be affected by bubbles. By adopting the existing printing structure, before printing, the printing platform 2 is assembled manually, then the release film assembly 3 is assembled manually, and finally, the levelling hub 4 is assembled manually; and after printing, the levelling hub 4, the release film assembly 3 and the printing platform 2 need to be manually disassembled sequentially before a printed sample is obtained.

The use of the levelling hob can realize quick levelling during large-breadth printing, but it also causes some problems: the requirement for the machining and assembly accuracy of the levelling hub 4 is extremely high; it is difficult to keep the motion plane of the levelling hub 4 in parallel with the XY motion plane, thus causing the problem that some areas of the release film assembly 3 are pressed excessively while some areas of the release film assembly 3 are not pressed; during use, it is difficult to determine the accurate positional relation between the levelling hub 4 and the release film assembly 3, so the levelling hub 4 may sometimes damage the printed sample when operating; when the hob is used for levelling, the levelling hub often has to roll repeatedly at a low speed, and has to be disassembled every time printing is completed.

The existing printing structure has the following defects:
1. It is difficult to machine and assemble the levelling hub, thus compromising the printing quality;
2. It is difficult to keep the motion plane of the levelling hob in parallel with the XY motion surface, thus compromising the printing quality;
3. It is difficult to determine the accurate positional relation between the levelling hub and a release film, thus compromising the printing quality;
4. When the hub is used for levelling, the levelling hub has to be rolled repeatedly at a low speed, thus compromising the printing efficiency;
5. The levelling hub has to be disassembled every time printing is completed, so operation is complex.

SUMMARY

The technical issue to be settled by the invention is to provide an improved 3D printing device and method so as to overcome the defects caused by the use of a levelling hub for large-breadth printing in the prior art.

In one aspect, the present invention provides a 3D printing device which comprises a liquid bath configured to contain liquid resin used for printing, the liquid bath comprising a main area and an extending area disposed on a side of a top of the main area; a printing platform configured to carry a printed sample, the printing platform being inserted into the main area of the liquid bath; and a release film assembly comprising a release film and a release film driving unit used for driving the release film to move horizontally between the main area and the extending area.

Preferably, the 3D printing device further comprises a bubble scraper disposed in the extending area, fixed at a bottom of the extending area of the liquid bath, and located at a side of the extending area close to the main area, and a top of the bubble scraper is flush with a bottom of the release film.

Preferably, the bubble scraper is mounted at the bottom of the extending area of the liquid bath through a spring and a guide shaft.

Preferably, the release film assembly comprises a mounting base plate; linear rails fixed on the mounting base plate, the linear rails extending in a first direction, which is parallel to a moving direction of the printing platform between the main area and the extending area of the liquid bath; and a release film support unit mounted on the linear rails, driven by the release film driving unit to move in the first direction, the release film support unit comprising a release film tensioning fixture, the release film being mounted on the release film tensioning fixture.

Preferably, the release film support unit comprises a transmission frame connected to the linear rails through slider; release film levelling pillars fixed on the transmission frame; and a levelling frame connected with the release film levelling pillars through release film levelling knobs, the release film tensioning fixture being mounted on the levelling frame.

Preferably, the release film driving unit comprises a stepping motor fixed at a bottom of the mounting base plate; and a synchronous belt connected to the stepping motor and the transmission frame to drive the transmission frame.

Preferably, stop blocks are disposed on the mounting base plate and located at four corners of the mounting base plate to prevent the transmission frame from moving out of limit.

Preferably, a position sensor is disposed on the mounting base plate, located at an edge of a side of the mounting base plate, and used for sensing a position of the transmission frame, and a horizontal moving position of the release film tensioning fixture is limited by the position sensor.

In another aspect, the present invention provides a 3D printing method using the 3D printing device described above. The method comprises:

S1, moving the release film to the extending area, and installing the printing platform in the main area of the liquid bath;

S2, controlling the printing platform to move to an initial printing position to ensure that the printing platform is spaced from a lower surface of the release film by one coating thickness;

S3, controlling the release film to move to the main area;

S4, focusing a pattern to the release film through a UV lens for exposure and curing to obtain a cured pattern;

S5, controlling the printing platform to descend to separate a printed sample obtained after curing from the release film;

S6, controlling the release film to horizontally move into the extending area of the liquid bath;

S7, repeating S2-S6 until the sample is completely printed; and

S8, controlling the release film to horizontally move to the extending area of the liquid bath, and disassembling the printing platform with the printed sample.

Preferably, bubbles at the bottom of the release film are removed in S6 by means of the bubble scraper fixed at the bottom of the extending area of the liquid bath.

The technical solution adopted by the invention to settle the above technical issue is as follows:

The invention has the following beneficial effects:
1. Various errors caused by the use of a quick levelling component such as a hub are eliminated, thus improving the printing quality;
2. An accurate printing thickness can be obtained by horizontally pushing printing liquid once by a release film, thus improving the printing efficiency;
3. When the printing platform is assembled or disassembled, the release film can move to the extending area of the liquid bath and does not need to be disassembled, so operation is simplified.

BRIEF DESCRIPTION OF THE DRAWINGS

The technical solution of the application will be further described below in conjunction with accompanying drawings and embodiments.

REFERENCE SIGNS

1, liquid bath; 2, printing platform; 3, release film assembly; 4, levelling hub; 5, bubble scraper; 6, liquid resin; 7, printing sample; 8, UV lens; 122, slider; 124, slider; 101, mounting base plate; 102 and 103, linear rail; 105, stepping motor; 107, synchronous belt; 108, stop block; 109, transmission frame; 110, 111 and 112, release film levelling pillar; 113, levelling frame; 114, position sensor; 120 and 121, release film levelling knob; 500, release film tensioning fixture; 200, liquid bath body; 52, spring; 51, guide shaft.

DESCRIPTION OF THE EMBODIMENTS

It should be pointed out that the embodiments of the application and the features in the embodiments can be combined without conflicts.

In the description of the application, it should be understood that terms such as "centre", "lengthwise", "crosswise", "upper", "lower", "front", "back", "left", "right", "vertical", "horizontal", "top", "bottom", "inner" and "outer", are used to indicate directional or positional relationships based on the accompanying drawings merely for the purpose of facilitating and simplifying the description of the application, do not indicate or imply that devices or elements referred to must be in a direction, or be constructed and operated in a specific direction, and thus, should not be construed as limiting the protection scope of the invention. In addition, terms such as "first" and "second" are merely for a purpose of description, and should not be construed as indicating or implying relative importance or implicitly indicating the number of technical features referred to. So, a feature defined by "first" or "second" may explicitly or implicitly indicate the inclusion of one or more said features. In the description of the invention, unless otherwise stated, "multiple" refers to two or more.

It should be noted that, unless otherwise expressly stated and defined, terms such as "assemble", "mount", "attach", "connect" and "link" in the description of the invention should be broadly understood. For example, "connect" may refer to fixed connection, detachable connection or integrated connection, or mechanical connection or electrical connection, or direct connection, indirect connection through an intermediate medium, or internal connection of two elements. Those skilled in the art can appreciate the specific meanings of these terms in the application as the case maybe.

The technical solution of the application will be described in detail below with reference to the accompanying drawings and embodiments.

Figure 2:
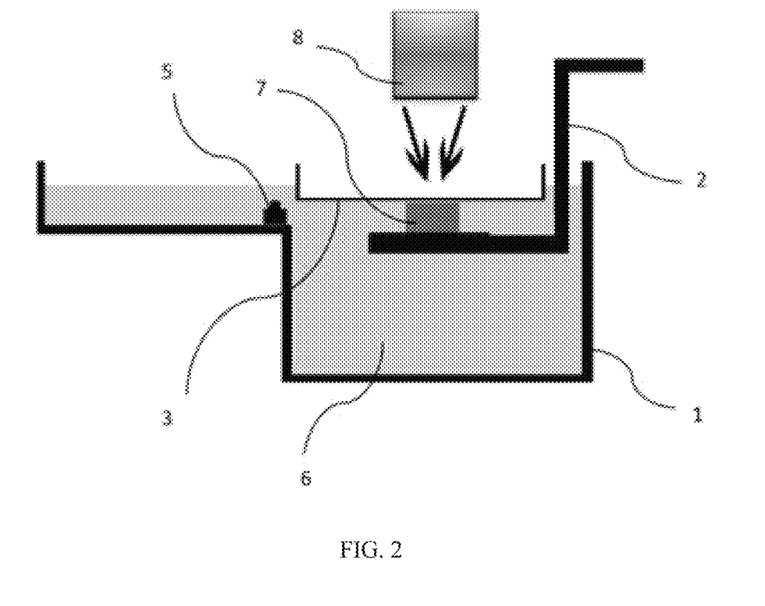
FIG. 2 is a structural view of a 3D printing device using a release film to push liquid horizontally to realize coating according to one embodiment of the application.

This embodiment provides a 3D printing device using a release film to push liquid horizontally to realize coating. As shown in FIG. 2, the 3D printing device comprises:

A liquid bath 1 configured to contain liquid resin 6 which is used for printing, the liquid bath 1 comprising a main area and an extending area disposed at one side of the top of the main area;

A printing platform 2 configured to carry a printed sample 7 and inserted into the main area of the liquid bath 1;

A release film assembly 3 comprising a release film and a release film driving unit used for driving the release film to move horizontally between the main area and the extending area; and A bubble scraper 5 disposed in the extending area, fixed at the bottom of the extending area of the liquid bath 1, and located at a side, close to the main area, of the extending area, the top of the bubble scraper 5 being flush with the bottom of the release film.

Figure 3:
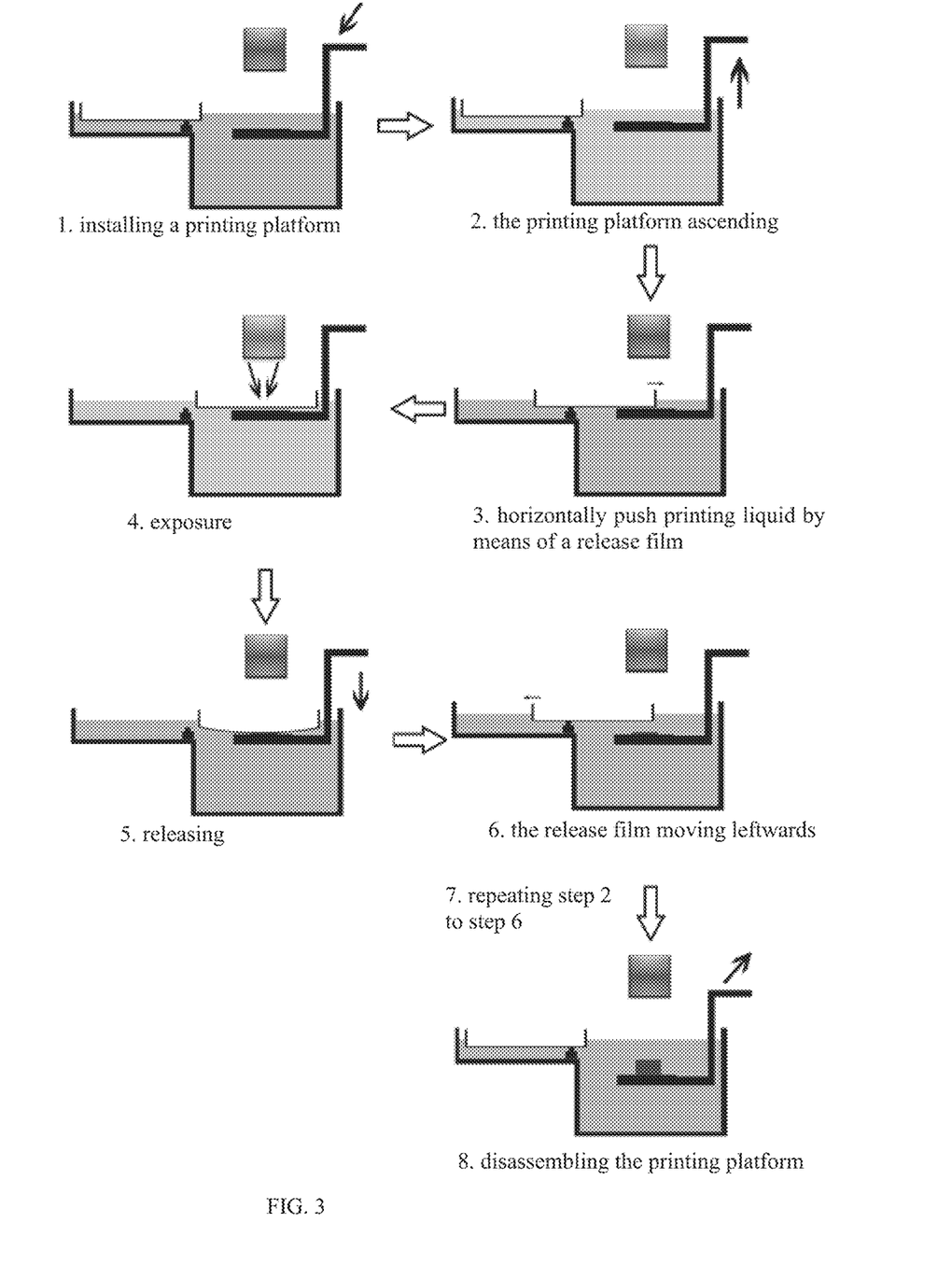
FIG. 3 is a schematic diagram of the operating steps of the 3D printing device using a release film to push liquid horizontally to realize coating according to one embodiment of the application.

According to the 3D printing device in this embodiment, the printing platform 2 is driven by a moving shaft (not shown) to ascend or descend, ascending and descending of the printing platform 2, movements of the release film assembly 3, UV exposure, and other motions are controlled by control software installed in an industrial personal computer, and the control software controls all components to act according to the flow diagram in FIG. 3. Innovations are made to the liquid bath 1, the release film assembly 3, the levelling hub 4, the bubble scraper 5 and specific printing process in the prior art (shown in FIG. 1) in the following aspects: the width of the left side of the liquid bath 1 is increased, the release film assembly 3 is allowed to move leftwards and rightwards, the levelling hub 4 is omitted, and the bubble scraper 5 is stopped from moving leftwards and rightwards. When levelling is needed during printing, the height of the printing platform 2 is controlled/adjusted to ensure that a distance equal to a thickness of one layer of coating is reserved between the lower surface of the release film assembly 3 and a to-be-printed surface, the release film assembly 3 moves rightwards from the left side of the printing platform 2, and liquid resin on the printing platform 2 is pushed rightwards by the edge of the right side of the release film assembly 3 and the liquid resin surface above which the liquid resin is pushed is instantly covered with release film in a tensioned state, such that the accuracy of the coating thickness between the lower surface of the release film and the to-be-printed surface is guaranteed.

Different from the existing coating method based on self-levelling, a release film, or a hub plus a release film, which promotes liquid levelling by applying a pressure to the liquid in a direction perpendicular to the liquid surface, the coating method in this application applies a tangential pushing force in a direction parallel with the liquid surface to promote liquid levelling, so redundant liquid can be discharged quickly, and an accurate coating thickness can be formed below the release film. Therefore, the method using a release film to push liquid horizontally to realize coating can realize high-quality and quick coating.

When the release film pushes liquid horizontally to realize coating, the specific movement speed of the release film is related to the printing breadth, the printing thickness and the liquid viscosity; with the increase of the printing breadth, the decrease of the printing thickness or the increase of the liquid viscosity, the movement speed of the release film will be decreased. For different liquids, the specific pushing speed of the release film can be set according to the actual condition.

In the aspect of operation, this method ensures that after the release film is levelled and focused, the printing platform 2 can be assembled easily before printing or disassembled easily after printing by only horizontally moving the release film to the left end/side of the liquid bath 1.

Figure 8:
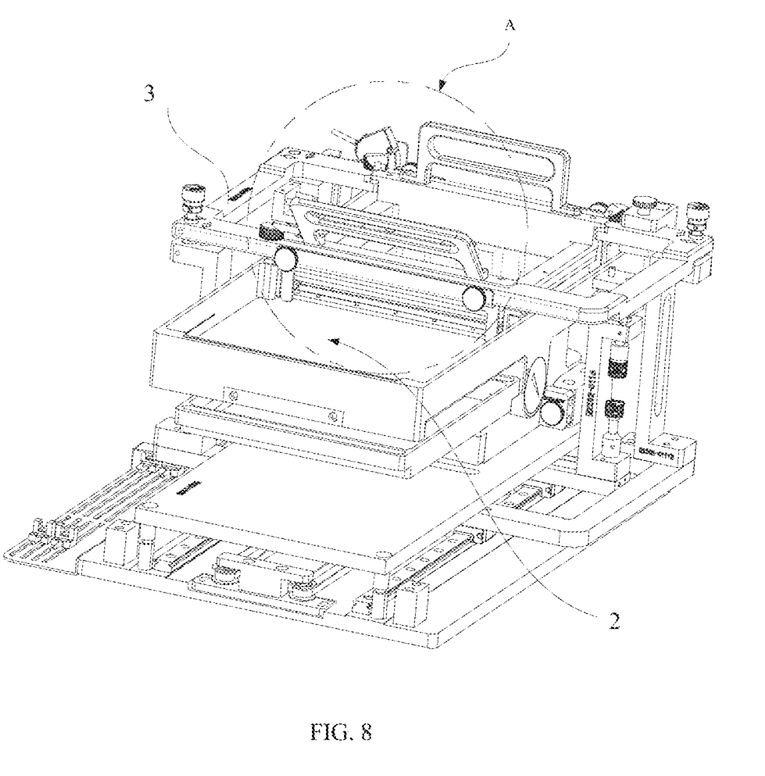
FIG. 8 illustrates the release film assembly in another aspect.
Figure 9:
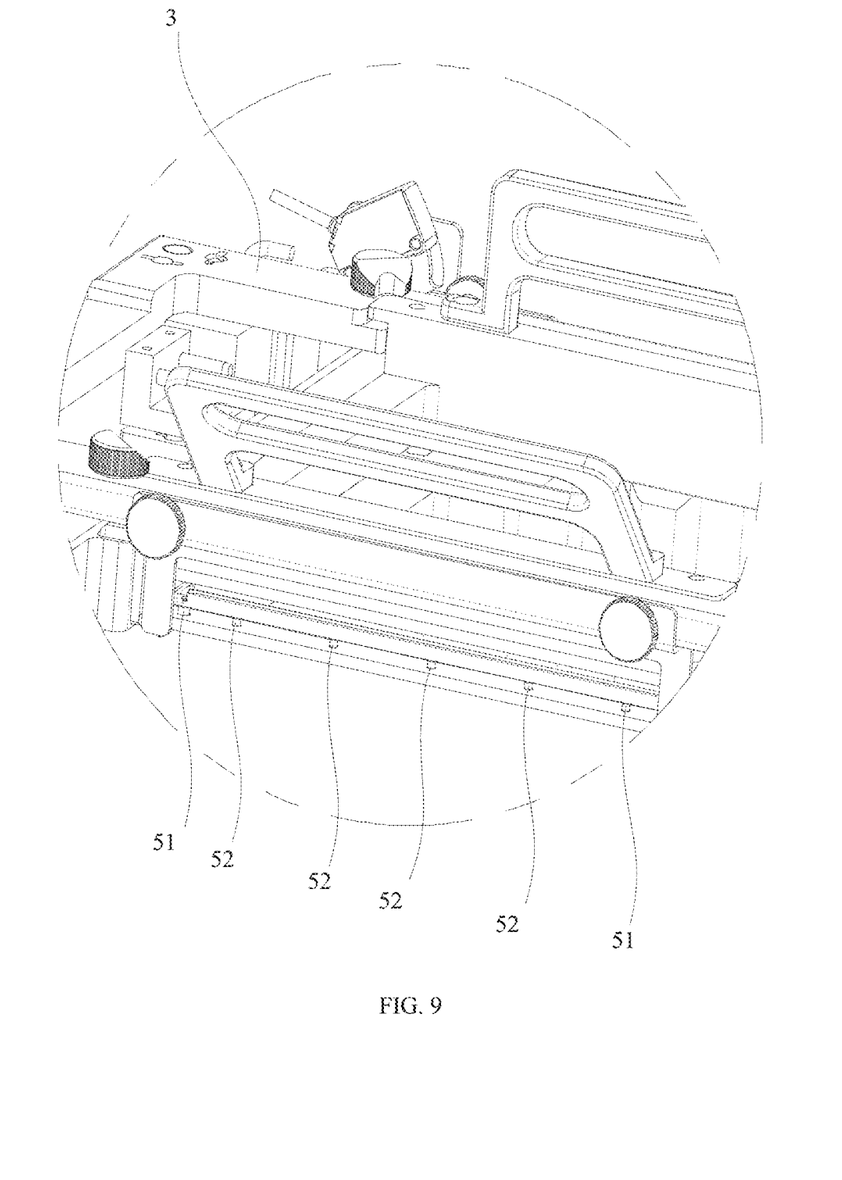
FIG. 9 is an enlarged view of an encircled portion A of FIG. 8.

Moreover, the bubble scraper 5 can float upwards and/or downwards slightly within a range of 2 mm under the action of one or more springs 52 and one or more guide shafts 51 as shown in FIGS. 8-9. When the release film horizontally moves leftwards or rightwards, the bubble scraper 5 horizontally moves leftwards or rightwards with respect to the release film to remove bubbles at the bottom of the release film. The bubble scraper 5 is a unidirectional bubble scraper or a bidirectional bubble scraper. Please refer to Chinese Patent Publication No. CN113942224A for the unidirectional bubble scraper, the contents of which is incorporated herein by reference.

According to the 3D printing device in this embodiment, as shown in FIG. 3, the printing platform 2 and the release film 3 have been levelled and focused before printing, and the 3D printing device is used as follows:

S1, the release film is moved to the extending area, and the printing platform 2 is installed in the main area of the liquid bath 1;

S2, the printing platform 2 is controlled to ascend or descend to an initial printing position to ensure that the printing platform 2 is spaced from the lower surface of the release film by one coating thickness;

S3, the release film is controlled to move to the main area;

S4, a pattern is focused to the release film through a UV lens 8 for exposure and curing to obtain a cured pattern. The exposure may be single-projection exposure, projection exposure based on multiple photocuring printers, or multi-projection exposure driven by X-direction and Y-direction shafts;

S5, the printing platform 2 is controlled to descend to separate a printed sample 7 obtained after curing from the release film;

S6, the release film is controlled to horizontally move into the extending area of the liquid bath 1;

S7, S2-S6 are repeated until the sample is completely printed; and

S8, the release film is controlled to horizontally move to the extending area of the liquid bath 1, and the printing platform 2 with the printed sample 7 is disassembled from the liquid bath 1.

In the above process, bubbles can be removed when the release film horizontally moves leftwards and rightwards. In actual use, the bubble scraper 5 may be used or not used, which depends on the actual condition. The bubble scraper 5 can be assembled to the liquid bath 1 when it is needed, and is disassembled from the liquid bath 1 when it is not needed.

Figure 4:
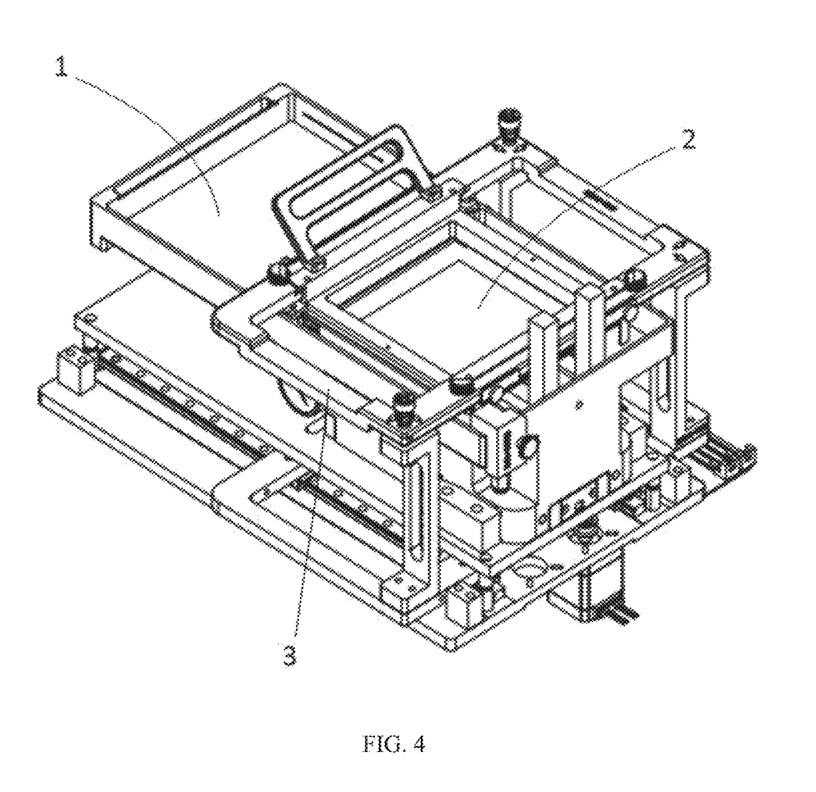
FIG. 4 is an overall three-dimensional structural view of the 3D printing device using a release film to push liquid horizontally to realize coating according to one embodiment of the application.
Figure 5:
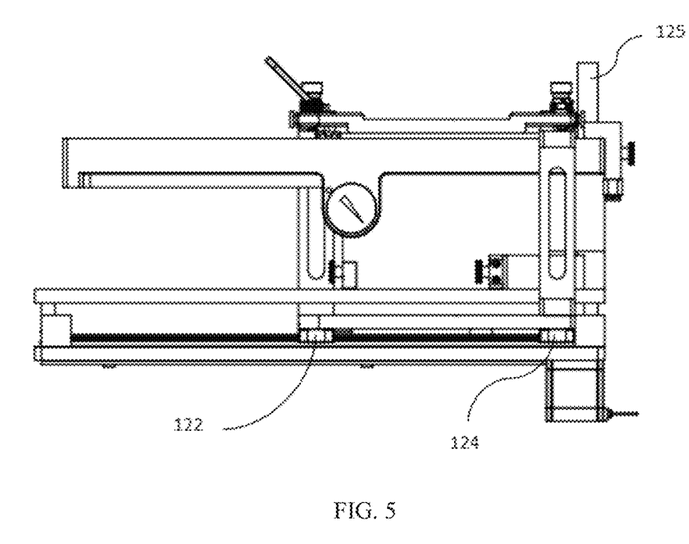
FIG. 5 is ab overall side structural view of the 3D printing device using a release film to push liquid horizontally to realize coating according to one embodiment of the application.
Figure 7:
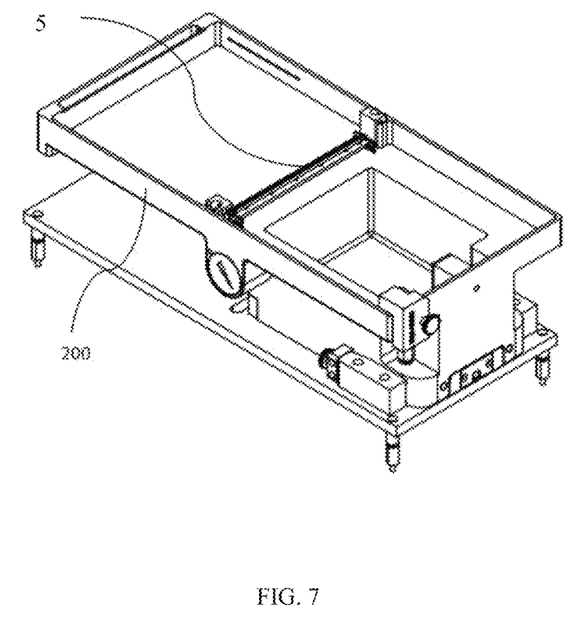
FIG. 7 is a structural diagram of a liquid bath body according to an embodiment of the invention.

Preferably, as shown in FIG. 4, FIG. 5 and FIG. 7, a liquid bath body 200 of the liquid bath 1 of the 3D printing device in this embodiment is hollow in order to contain liquid resin. As shown in FIG. 7, the main area of the liquid bath 1 is located at the right side and is deep, the extending area of the liquid bath 1 is located at the left side and is shallow, and a bubble scraper 5 is fixed at the bottom of the edge of the side, close to the main area, of the extending area.

Figure 6:
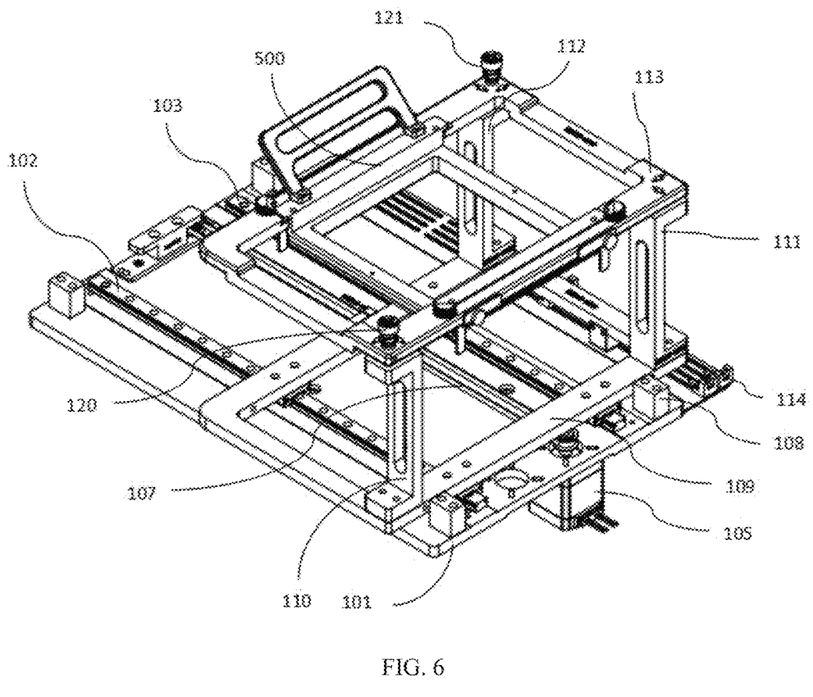
FIG. 6 is an overall structural view of a release film assembly according to one embodiment of the invention.

Preferably, as shown in FIG. 4, FIG. 5 and FIG. 6, the release film assembly 3 comprises:

A mounting base plate 101;

Linear rails 102 and 103 extending in a first direction (i.e., the moving direction of the printing platform 2 between the main area and the extending area of the liquid bath 1) and fixed on the mounting base plate 101; and Amounted on the linear rails 102 and 103, driven by the release film driving unit to move in the first direction, and comprising a release film tensioning fixture 500, wherein the release film is mounted on the release film tensioning fixture 500.

Preferably, as shown in FIG. 5 and FIG. 6, the release film support unit comprises:

A transmission frame 109 connected to the linear rails 102 and 103 through sliders 124;

Release film levelling pillars 110, 111 and 112 fixed on the transmission frame 109; and A levelling frame 113 connected with the release film levelling pillars 110, 111 and 112 through release film levelling knobs 120 and 121, wherein the release film tensioning fixture 500 is mounted on the levelling frame 113.

By adopting this structure, the release film support unit can move in the first direction, and the levelness of the levelling frame 113 can be adjusted through the release film levelling knobs 120 and 121. Specifically, as shown in FIG. 6, the transmission frame 109 and the levelling frame 113 are rectangular, and the release film levelling pillars 110, 111 and 112 are mounted at three corners of the transmission frame 109 and the levelling frame 113. The release film tensioning fixture 500 can be levelled by levelling the levelling frame 113, thus ensuring that the release film is parallel with a projection focal plane. Upper ends of the three release film levelling pillars are connected with the levelling frame 113 through tension springs (not shown), levelling knobs and steel balls (not shown), such that the levelling frame 113 can be levelled through the levelling knobs. The number of the levelling knobs is two.

Preferably, the release film driving unit comprises:

A stepping motor 105 fixed at the bottom of the mounting base plate 101; and A synchronous belt 107 connected with the stepping motor 105 and the transmission frame 109 to drive the transmission frame 109. Optionally, the release film driving unit may be any linear driving assembly such as a stepping motor, a linear guide rail or a synchronous belt, or the combination of a servo motor, a linear rial and a lead screw, or other assemblies capable of moving linearly.

Optionally, stop blocks 108 are disposed on the mounting base plate 101 and are located at four corners of the mounting base plate 101 to prevent the transmission frame 109 from moving out of limit. A position sensor 114 is disposed on the mounting base plate 101, located on the edge of one side of the mounting base plate 101, and used for sensing the position of the transmission frame 109, and the horizontal moving position of the release film tensioning fixture 500 is limited by the position sensor 114.

The above ideal embodiments of the application are enlightenments, and with reference to the above description, relevant personnel can make various modifications and amendments without deviating from the scope of the technical concept of the application. The technical scope of the application is not limited to the above description in the specification, and should be defined according to the scope of the claims.

What is claimed is:

1. A 3D printing device using a release film to push liquid horizontally to realize coating, comprising: a liquid bath (1) configured to contain liquid resin (6) used for printing, the liquid bath comprising a main area and an extending area disposed on a side of a top of the main area; a printing platform (2) configured to carry a printed sample (7), the printing platform (2) being inserted into the main area of the liquid bath (1); and a release film assembly (3) comprising a release film and a release film driving unit used for driving the release film to move horizontally between the main area and the extending area; wherein the release film assembly (3) comprises: a mounting base plate (101); linear rails (102, 103) fixed on the mounting base plate (101), the linear rails extending in a first direction, which is parallel to a moving direction of the printing platform (2) between the main area and the extending area of the liquid bath (1); and a release film support unit mounted on the linear rails (102, 103), driven by the release film driving unit to move in the first direction, the release film support unit comprising a release film tensioning fixture (500), the release film being mounted on the release film tensioning fixture (500); and wherein the release film support unit comprises: a transmission frame (109) connected to the linear rails (102 and 103) through sliders (124); release film levelling pillars (110, 111, 112) fixed on the transmission frame (109); and a levelling frame (113) connected with the release film levelling pillars (110, 111, 112) through release film levelling knobs (120, 121), the release film tensioning fixture (500) being mounted on the levelling frame (113).

2. The 3D printing device according to claim 1, wherein the 3D printing device further comprises a bubble scraper (5) disposed in the extending area, fixed at a bottom of the extending area of the liquid bath (1), and located at a side of the extending area close to the main area, and a top of the bubble scraper (5) is flush with a bottom of the release film.

3. The 3D printing device according to claim 2, wherein the bubble scraper (5) is mounted at the bottom of the extending area of the liquid bath (1) through a spring (52) and a guide shaft (51).

4. The 3D printing device according to claim 1, wherein the release film driving unit comprises: a stepping motor (105) fixed at a bottom of the mounting base plate (101); and a synchronous belt (107) connected to the stepping motor (105) and the transmission frame (109) to drive the transmission frame (109).

5. The 3D printing device according to claim 1, wherein stop blocks (108) are disposed on the mounting base plate (101) and located at four corners of the mounting base plate (101) to prevent the transmission frame (109) from moving out of limit.

6. The 3D printing device according to claim 1, wherein a position sensor (114) is disposed on the mounting base plate (101), located at an edge of a side of the mounting base plate (101), and used for sensing a position of the transmission frame (109), and a horizontal moving position of the release film tensioning fixture (500) is limited by the position sensor (114).

7. A 3D printing method using the 3D printing device according to claim 1, the method comprising:

S1, moving the release film to the extending area, and installing the printing platform (2) in the main area of the liquid bath (1);

S2, controlling the printing platform (2) to move to an initial printing position to ensure that the printing platform (2) is spaced from a lower surface of the release film by one coating thickness;

S3, controlling the release film to move to the main area;

S4, focusing a pattern to the release film through a UV lens (8) for exposure and curing to obtain a cured pattern;

S5, controlling the printing platform (2) to descend to separate a printed sample (7) obtained after curing from the release film;

S6, controlling the release film to horizontally move into the extending area of the liquid bath (1);

S7, repeating S2-S6 until the sample is completely printed; and

S8, controlling the release film to horizontally move to the extending area of the liquid bath (1), and disassembling the printing platform (2) with the printed sample (7).

8. The 3D printing method according to claim 7, wherein bubbles at the bottom of the release film are removed in S6 by means of the bubble scraper (5) fixed at the bottom of the extending area of the liquid bath (1).

\* \* \* \* \*